July 23, 1946.  E. G. HALBY ET AL  2,404,494
ROTARY SEAL
Filed Aug. 5, 1943  3 Sheets-Sheet 1

INVENTORS
EDWIN G. HALBY
ROBERT J. BUSHONG
BY
ATTORNEY

INVENTORS
EDWIN G. HALBY
ROBERT J. BUSHONG

ATTORNEY

July 23, 1946.   E. G. HALBY ET AL   2,404,494
ROTARY SEAL
Filed Aug. 5, 1943   3 Sheets-Sheet 3

INVENTORS
EDWIN G. HALBY
ROBERT J. BUSHONG
ATTORNEY

Patented July 23, 1946

2,404,494

UNITED STATES PATENT OFFICE 2,404,494

ROTARY SEAL

Edwin G. Halby and Robert J. Bushong, Marion, Ohio, assignors to The Marion Steam Shovel Company, Marion, Ohio, a corporation of Ohio Application August 5, 1943, Serial No. 497,416

23 Claims. (Cl. 285—96.3)

This invention relates to a rotary seal and is designed primarily for sealing a connection between a source of fluid under pressure, usually air, and a shaft or other element having a longitudinal passage or passages for conducting fluid to a fluid operated device or devices.

One object of the invention is to provide a device of simple compact construction which will effectively seal a connection between a rotary member and a stationary member, one of which is connected with a source of fluid supply and the other of which is provided with one or more fluid passages.

A further object of the invention is to provide such a sealing device which will individually and effectively seal each of the connections between a source of fluid supply and a plurality of passages in one of said members.

A further object of the invention is to provide such a sealing device having separate sealing elements for the several connections between the member which is connected with the source of fluid supply and the passages in the other member.

A further object of the invention is to provide such a sealing device in which each of said passages is connected with a source of fluid supply by a separate conduit.

A further object of the invention is to provide such a seal in which the sealing element is automatically adjusted to compensate for wear.

A further object of the invention is to provide such a seal in which the supply of fluid to one or more of said passages may be interrupted without affecting the supply of fluid to the other passage or passages.

Other objects of the invention may appear as the device is described in detail.

Figure 1:
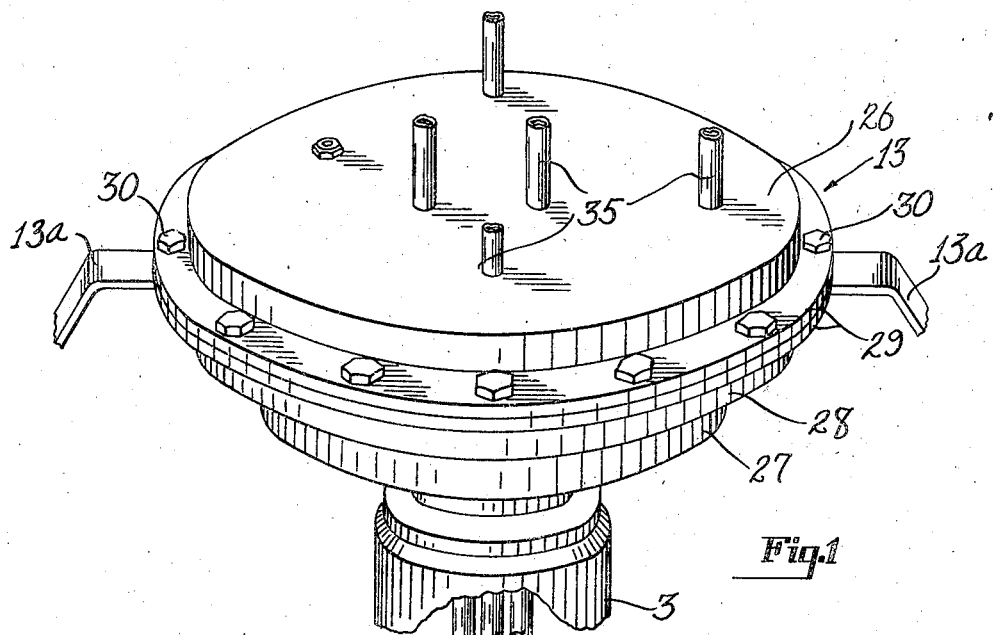
Figure 2:
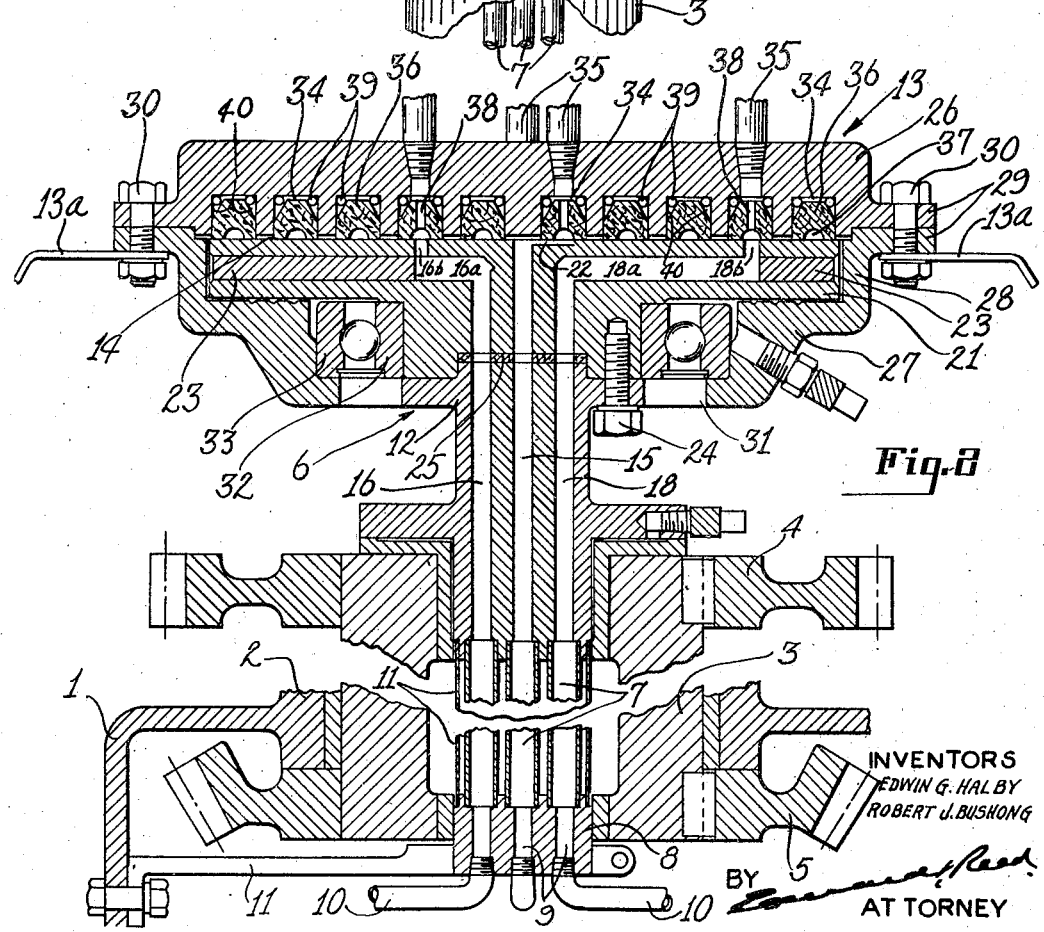
Figure 3:
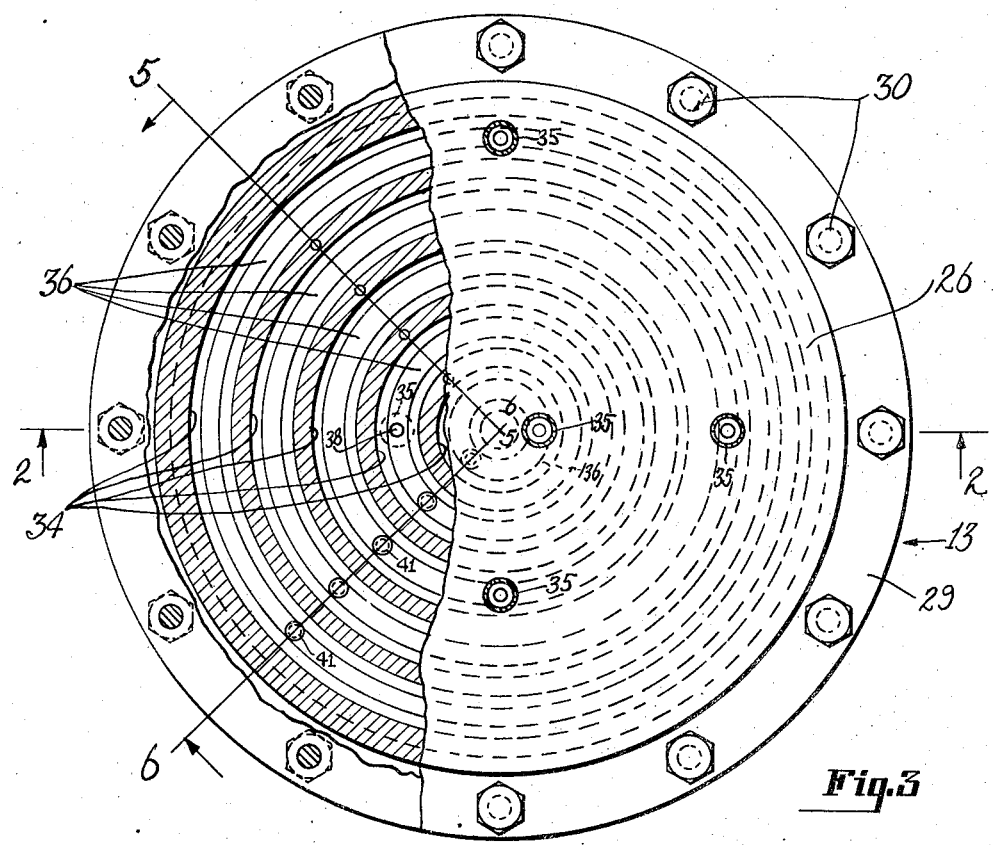
Figure 4:
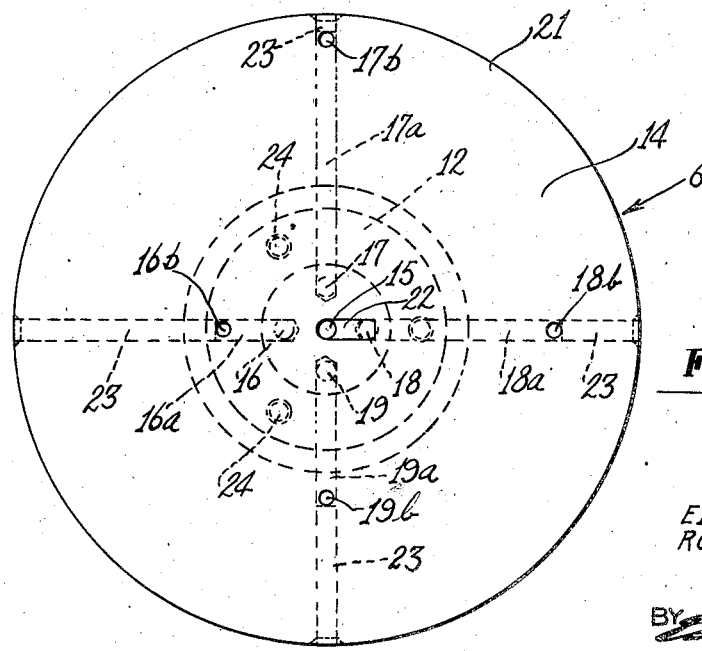
Figure 5:
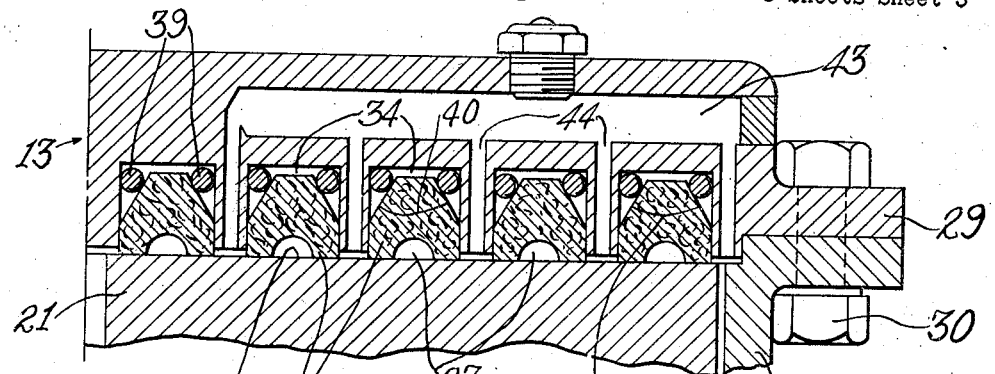
Figure 6:
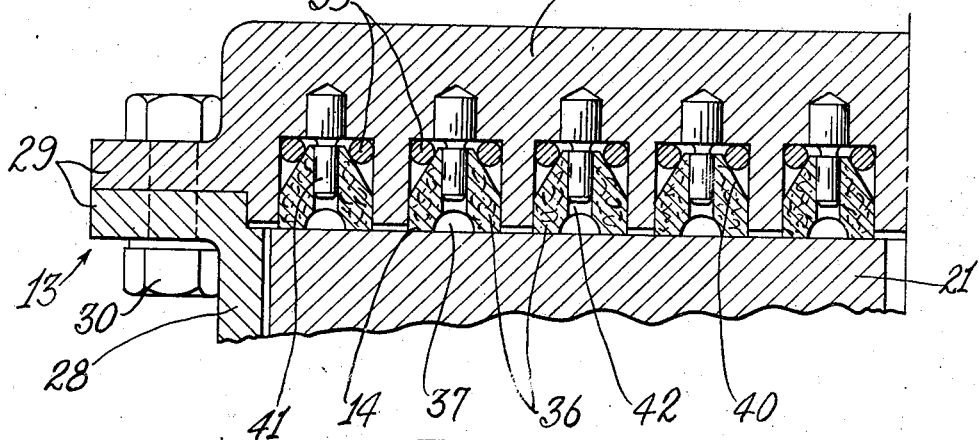
Figure 7:
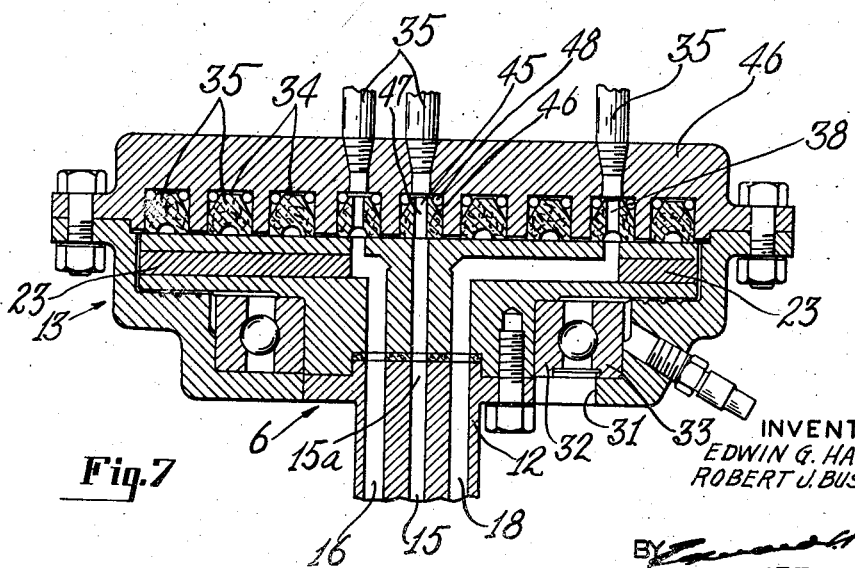

In the accompanying drawings:

Fig. 1 is a perspective view of a rotary seal embodying my invention; Fig. 2 is a sectional view taken centrally through such a seal; Fig. 3 is a top plan view of the seal, partly broken away to show the sealing elements within the same; Fig. 4 is a top plan view of the rotor of the seal; Fig. 5 is a section taken on the line 5—5 of Fig. 3; Fig. 6 is a section taken on the line 6—6 of Fig. 3; and Fig. 7 is a sectional view showing a slightly modified form of the seal.

In these drawings we have illustrated one embodiment of our invention and have shown the same in connection with a vertical shaft of an excavating machine, but it is to be understood that the invention may take various forms and may be applied to shafts or other rotary structures of various kinds, either vertical or horizontal.

The rotary seal comprises two members one of which is rotatable with relation to the other and which are connected respectively with a rotary part and a relatively stationary part of the mechanism to which the seal is applied. The machine to which the seal is applied in the illustrated embodiment includes a base 1 which is supported by traction wheels, not shown, and has an upwardly extending tubular part or center pin 2 about which revolves a platform, not shown, which carries the power plant and the excavating mechanism. Rotatably supported in the center pin is a shaft 3, the upper end of which extends above the platform and is connected by a gear 4 with driving mechanism on the platform, and the lower end of which is connected by a gear 5 with the mechanism for propelling the traction device. Extending through the shaft 3 are a plurality of longitudinal passages which are connected at their upper ends with one member 6 of the rotary seal and at their lower ends with fluid operated devices supported by the base. The passages may be provided in any suitable manner and, in the present construction it is desirable that they be separate from the shaft so that the latter may rotate with relation thereto. When, as in the present instance, the shaft is of substantial length it is preferably tubular in form and the passages comprise pipes 7 connected at their upper ends to the member 6 of the seal, which is held against rotation with the shaft, and connected at their lower ends with a member extending into the shaft and having passages 9 connecting the pipes 7 with other conduits 10 leading to the respective fluid operated devices. The member 8 is anchored to the base 1 by a bar 11 to prevent its rotation with the shaft. Preferably the members 6 and 8 are rigidly connected one with the other, as by a cylindrical member 12. The other member 13 of the rotary seal is connected with the platform for rotation therewith, as by brackets 13a. Thus the member 6 constitutes the stationary member of the seal, herein called the stator, and the member 13 constitutes the rotary member of the seal and is therein referred to as the rotor. However, either member of the rotary seal may be the rotary member and in some installations the member 6 is connected with the shaft, or other rotatable device, for rotation therewith and the member 13 is held against rotation. Therefore the terms "rotor" and "stator" are to be considered terms of description and not of limitation.

The two members of the rotary seal may take various forms and may be connected one with the other in any suitable manner. One member is provided with a passage or passages to communicate with the passage or passages in the shaft and has a smooth surface opposed to an adjacent surface of the other member and constituting a sealing surface through which the passage or passages therein extend. The other member is provided with means for connecting the passage or passages of the first mentioned member with the source of fluid supply and for sealing the connection or connections. In the arrangement here shown the passages are in the stator and the connecting and sealing means are in the rotor but this arrangement may be reversed when desirable. Preferably a separate sealing element is provided for each passage of the stator and the sealing element is provided with an opening therethrough which is in constant communication with the fluid source and with the passage in the stator with which that sealing element is associated, the communication between the opening in the sealing element and the passage in the stator being established through an annular channel which is in constant communication with both the passage and the opening and is preferably formed in the sealing element. The sealing element is so arranged with relation to the rotor that it is subjected to the pressure of the incoming fluid and is pressed thereby into firm sealing contact with the sealing surface of the stator. In the preferred arrangement the stator is connected with the end of a shaft and the opposed surfaces of the stator and the rotor extend transversely to that shaft, but this arrangement is not essential to the operation of the seal.

In the construction here illustrated the stator as a whole is indicated at 6 and extends into the rotor 13, which rotates about the same. The stator comprises an elongate part 12 one end of which is adapted to be supported on the shaft 3 and held against rotation therewith, and also includes a part provided with a smooth transverse surface 14 constituting a sealing surface. The stator is formed with a plurality of passages, in the present instance five, as shown at 15, 16, 17, 18 and 19, which are arranged in longitudinal alinement with and in open communication with corresponding passages 7 in the shaft 3 and extend through the sealing surface 14 at points spaced different radial distances from the axis of the stator, the sealing surface being of a diameter sufficient to permit the proper spacing of the passages therein. In the present construction the inner end portion of the stator, which has the sealing surface, is in the form of a relatively thin circular head 21 of a diameter substantially greater than the diameter of the elongate outer portion 12 of the stator, and each of the passages 16, 17, 18 and 19 includes a laterally extending portion 16a, 17a, 18a and 19a, formed in the head 21 and leading to a second longitudinal portion or port which opens through the sealing surface 14, as shown at 16b, 17b, 18b and 19b. The longitudinal portion of the passage 15 is at the axis of the rotor and the lateral portion of that passage and the port therefor are formed by a short channel 22 in the sealing surface. The longitudinal portions of the other passages are arranged about the passage 15 and the lateral portions thereof are formed by substantially radial bores in the head 21 leading respectively to the ports 16b, 17b, 18b and 19b, the end portions of the bores, beyond the ports, being plugged, as shown at 23. In the present instance the elongate part 12 of the stator is of considerable length and for convenience of assembling and servicing is divided transversely into two parts which are rigidly connected one with the other by screws 24 and the connection is sealed by a gasket 25 through which the several passages extend.

The rotor 13 may be of any suitable construction which will permit the stator to be rotatably connected therewith and maintained in proper relation thereto, and the means for connecting the stator passages with the source of fluid supply and for sealing said connections may take various forms. Preferably, the rotor comprises a circular housing adapted to receive the head 21 of the stator and having an opening in one end thereof through which the elongate portion 12 of the stator extends, and in which the stator is rotatably supported. As here shown the housing is formed in two parts and comprises upper and lower end walls 26 and 27, the lower wall being spaced from the upper wall by a circumferential wall 28, and the upper wall and the circumferential wall having opposed radially extending flanges 29 rigidly connected one to the other by bolts 30. The head 21 of the stator is supported in the space between the upper and lower walls of the housing and the outer elongate portion 12 of the stator extends through a relatively large opening 31 in the lower wall of the housing. Arranged between the stator and the lower wall of the housing is an anti-friction bearing, the inner race 32 of which is secured to the stator and the outer race 33 of which is secured to the lower wall of the housing, the arrangement of the bearing being such that the head 21 is supported out of contact with the housing.

The upper wall 26 of the rotor is provided in its inner surface with a plurality of annular recesses 34 which are concentric with the axis of the stator and face the sealing surface thereof, the radii of the several recesses being such that each recess is located above the port of one of the passages in the rotor. These recesses may be connected with a source of supply of air or other fluid under pressure in any suitable manner and in the preferred arrangement the several recesses are separately connected with the fluid source, as by individual conduits 35 which communicate with the outer portions of the respective recesses. Preferably the inner surface of the upper wall of the housing is supported out of contact with the sealing surface 14 of the stator and supported in each annular recess is an annular sealing member 36 which is arranged to have sealing contact with the sealing surface of the stator and is provided with an annular channel which has constant communication with the fluid source and with the port of the stator passage with which that recess is associated. In the present instance the channel comprises a groove 37 formed in the inner surface of the sealing element between the lateral edges thereof and extending over and having constant communication with the corresponding port in the sealing surface 14, the lateral portions of said inner surface of said sealing element being in contact with said sealing surface. Each sealing element has one or more openings 38 extending therethrough and connecting the groove 37 therein with the outer portion of the recess and with the source of fluid. The sealing element is transversely movable in the recess and the outer surface thereof is spaced from the outer wall of the recess so that the inner surface thereof may be pressed into firm sealing contact with the sealing surface of the rotor by the pressure of the fluid entering the recess, or by any other suitable means.

Arranged in the outer portion of the recess is means for preventing the passage of fluid between the sealing element and the side walls of the recess, and in the arrangement shown, this means comprises a pair of sealing rings 39 arranged to have sealing engagement with the respective side walls of the recess and with the adjacent portion of the sealing element therein, the outer portion of said sealing element being of a width less than the width of the corresponding portion of the recess to provide spaces in which the sealing rings may be seated. Preferably the outer portions of the lateral surfaces of the sealing element converge outwardly, as shown at 40, to form tapered channels between the same and the respective walls of the recess into which the sealing rings may be pressed by the action of the fluid thereon. The sealing elements and the sealing rings may be formed of any suitable material but we prefer that the sealing elements 36 shall be formed of a relatively hard material having a low coefficient of friction, such as graphite, and that the sealing rings be formed of yieldable material, such as soft rubber, which can be distorted into tight sealing contact with the cooperating surfaces.

Preferably the sealing elements are positively connected with the rotor so that they will not be displaced by their contact with the stator, and this may be conveniently accomplished by studs 41 (Fig. 6) mounted in the outer walls of the annular recesses and extending into sockets 42 in the respective sealing elements. It is also desirable to lubricate the sealing surface of the stator and for this purpose there is formed in the outer wall 26 of the rotor, outwardly beyond and transversely to the annular recesses 34, a lubricant receptacle or channel 43 (Fig. 5) and openings 44 are formed in said wall between adjacent annular recesses to conduct lubricant from the receptacle to the sealing surface.

In the construction shown in Figs. 1 to 4 the axial passage 15 in the stator is provided at its inner end with a lateral extension or channel in the sealing surface thereof so that it may be sealed by an annular sealing member, which provides a relatively large sealing surface and has a correspondingly large surface exposed to the action of the fluid to press the sealing element against the sealing surface. However, this is not essential and, if desired, the lateral extension to the axial passage, the innermost of the annular recesses, which communicates with that passage, and the annular sealing element associated therewith may be omitted, and in lieu thereof an axial recess 45 may be formed in the upper, or outer, wall 26 of the rotor, as shown in Fig. 7, and connected with the source of fluid by a conduit 35. Mounted in this recess is a tubular sealing element 46 having a frusto-conical end portion and a central passage 47 connecting the recess 45 with the axial passage 15 in the stator. A single sealing ring 48 extends about the conical end portion of the sealing member 46 and is pressed into sealing contact with said end portion and with the wall of the recess to prevent the passage of fluid between the sealing element and the wall of the recess. When the tubular sealing element is thus substituted for the annular sealing element the diameters of the remaining annular recesses and sealing elements may be shortened and the overall size of the sealing surface correspondingly reduced.

It will be apparent from the foregoing description that a constant supply of fluid under pressure to the shaft passages may be maintained without leakage, as the grooves in the annular sealing elements are at all times in open communication with the respective stator passages and with the fluid source, and the pressure of the fluid on the annular sealing elements maintains the relatively large inner surfaces thereof in firm contact with the sealing surface of the rotor and provides a highly efficient seal. The sealing elements are automatically adjusted to compensate for wear, due to the fact that their inward movement under pressure is limited only by their contact with the sealing surface of the stator. The several stator passages being connected with the source of fluid supply by separate conduits it is possible, by providing the supply conduits with valves, not shown, to interrupt the flow of fluid to one or more of the shaft passages when the device supplied by that passage is not in use and to accomplish this without in any way affecting the supply of fluid to the other passages.

While we have shown and described one embodiment of our invention, and a minor modification thereof, we wish it to be understood that we do not desire to be limited to the details thereof as various modifications may occur to a person skilled in the art.

Having now fully described our invention, what we claim as new and desire to secure by Letters Patent, is:

1. In a rotary seal, a stationary member and a rotatable member, one of said members having a sealing surface adjacent the other member and having a plurality of passages extending through said sealing surface, a plurality of annular sealing elements supported between said members and engaging said sealing surface, each sealing element having an annular channel in constant communication with one of said passages in said sealing surface, said other member having means for separately connecting the channel of each sealing element with a source of fluid supply and for pressing said sealing element into firm contact with said sealing surface.

2. In a rotary seal, a stationary member and a rotatable member, one of said members having a sealing surface adjacent the other member and having a plurality of passages extending through said sealing surface, said other member having a plurality of concentric annular recesses arranged about the axis of the rotatable member and facing said sealing surface, and also having means for separately connecting said recesses with a source of fluid supply, and an annular sealing element supported in each of said recesses in contact with said sealing surface and having an annular channel in constant communication with said recess and with one of said passages.

3. In a rotary seal, a stationary member and a rotatable member, one of said members having a sealing surface adjacent the other member and having a plurality of passages extending through said sealing surface, said other member having a plurality of annular recesses arranged about the axis of the rotatable member and facing said sealing surface, and also having means for connecting said recesses with a source of fluid supply, an annular sealing member supported in each of said recesses in contact with said sealing surface and having an annular channel in constant communication with said recess and with one of said passages, and means in said recess for preventing the passage of fluid between said sealing element and the side walls of said recess.

4. In a rotary seal, a stationary member and a rotatable member, one of said members having a sealing surface adjacent the other member and having a plurality of passages extending through said sealing surface, said other member having a plurality of annular recesses arranged about the axis of the rotatable member and facing said sealing surface, and also having means for connecting said recesses with a source of fluid supply, an annular sealing element supported in each of said recesses and having in that surface thereof which is adjacent said sealing surface an annular groove in constant communication with said recess and with one of said passages, said surface of said sealing element having sealing contact with said sealing surface on each side of said groove, each recess and a portion of the sealing element within said recess having converging surfaces at the respective sides of said sealing element, and sealing members arranged between said converging surfaces.

5. In a rotary seal, a stationary member and a rotatable member, one of said members having a sealing surface adjacent the other member and having a passage extending through said sealing surface at a point spaced from the axis of the rotatable member, an annular sealing element supported by said other member with one surface thereof in contact with said sealing surface, one of said surfaces having an annular groove in constant communication with said passage and so arranged with relation to said surface of said sealing element that the latter may have contact with said sealing surface on each side of said groove, said sealing element having a passage therethrough communicating with said groove, and said other member having means for connecting said passage in said sealing element with a source of fluid supply.

6. In a rotary seal, a stationary member and a rotatable member, one of said members having a sealing surface adjacent the other member and having a passage extending through said sealing surface at a point spaced from the axis of the rotatable member, said other member having an annular recess arranged about and spaced from said axis, an annular sealing element supported in said recess with one surface thereof in contact with said sealing surface, one of said surfaces being provided with an annular groove in constant communication with said passage, and so arranged with relation to said surface of said sealing element that the latter may have contact with said sealing surface on each side of said groove, said sealing element having an opening therethrough connecting said groove with the outer portion of said recess, and said other member having means for connecting the outer portion of said recess with a source of fluid supply.

7. In a rotary seal, a stationary member and a rotatable member, one of said members having a sealing surface adjacent the other member and having a passage extending through said sealing surface at a point spaced from the axis of the rotatable member, said other member having an annular recess arranged about and spaced from said axis, an annular sealing element supported in said recess with one surface thereof in contact with said sealing surface and having in said surface thereof an annular groove spaced from the lateral edges thereof and in constant communication with said passage, said sealing element also having an opening therethrough connecting said groove with the outer portion of said recess, and means for preventing the passage of fluid between said sealing element and the side walls of said recess, said other member having means for connecting the outer portion of said recess with a source of fluid supply.

8. In a rotary seal, two members one of which is rotatable with relation to the other, one of said members having a surface transverse to the axis of the rotatable member and also having a passage extending through said transverse surface at a point spaced from said axis, the other member having a part opposed to said transverse surface and provided with a recess, an annular sealing element extending about said axis, arranged to have sealing contact with said transverse surface and extending into said recess, said sealing element having an annular channel in constant communication with said passage and with said recess, said other member having means whereby said recess may be connected with a source of supply of fluid under pressure.

9. In a rotary seal having two members one of which is rotatable with relation to the other, one of said members having a surface transverse to the axis of the rotatable member, and also having a passage extending through said transverse surface at a point spaced from said axis, the other member having a part opposed to said transverse surface and provided with a recess, an annular sealing element extending about said axis, arranged to have sealing contact with said transverse surface and extending into said recess, said sealing element having an annular channel in constant communication with said passage, and with said recess, and sealing means in said recess to prevent the passage of fluid between said sealing element and the walls of said recess, said other member having means whereby said recess may be connected with a source of supply of fluid under pressure to supply fluid to said passage and exert pressure on said sealing element and said sealing means.

10. In a rotary seal, two members one of which is rotatable with relation to the other, one of said members having a surface transverse to the axis of the rotatable member and also having a passage extending through said transverse surface at a point spaced from said axis, the other member having a part opposed to said transverse surface and provided with a recess extending about and spaced from said axis, an annular sealing element supported in said recess for movement in the direction of its axis into sealing engagement with said transverse surface, said sealing element having between the lateral edges of that surface thereof which is adjacent said transverse surface an annular groove concentric with said axis and communicating with said passage and with said recess, and means for preventing the passage of fluid between said sealing element and the side walls of said recess, said other member having means whereby said recess may be connected with a source of fluid supply.

11. In a rotary seal, two members one of which is rotatable with relation to the other, one of said members having a surface transverse to the axis of the rotatable member and also having a passage extending through said transverse surface at a point spaced from said axis, the other member having a part opposed to said transverse surface and provided with an annular recess extending about and spaced from said axis and also having means whereby said recess may be connected with a source of supply for fluid under pressure, an annular sealing element supported in said recess and arranged to be pressed into sealing engagement with said transverse surface by the pressure of the fluid entering said recess, said sealing element having an annular groove concentric with said axis and communicating with said recess and with said passage, and pressure controlled means in said recess to prevent the passage of fluid between said sealing element and the side walls of said recess.

12. In a rotary seal, two members one of which is rotatable with relation to the other, one of said members having a surface transverse to the axis of said rotatable member and also having a passage extending through said transverse surface at a point spaced from said axis, the other member having a part opposed to said transverse surface and provided with an annular recess extending about said axis, an annular sealing element supported in said recess with one face thereof in contact with said transverse surface and having in said face an annular groove concentric with said axis and communicating with said passage and with said recess, said other member having means whereby said recess may be connected with a source of supply of fluid under pressure, and sealing rings in said recess cooperating with said sealing element and the walls of said recess to prevent the passage of fluid between said sealing element and said walls.

13. In a rotary seal, two members one of which is rotatable with relation to the other, one of said members having a surface transverse to the axis of the rotatable member and also having a passage extending through said transverse surface at a point spaced from said axis, the other member having a part opposed to said transverse surface and provided with an annular recess extending about said axis, an annular sealing element of substantially rigid material supported in said recess for sealing contact with said transverse surface, said sealing element having an annular groove communicating with said passage, and an opening connecting said groove with said recess, said sealing element also having inclined lateral surfaces in said recess, and sealing rings of yieldable material arranged in said recess to engage the respective inclined surfaces of said sealing element and the adjacent walls of said recess, said other member having means whereby fluid under pressure may be introduced into said recess.

14. In a rotary seal, a rotor, a stator extending into said rotor, said stator and said rotor having opposed surfaces transverse to the axis of said rotor, said stator having a port in said transverse surface thereof and a longitudinal passage communicating with said port, said rotor having in said transverse surface thereof an annular recess concentric with the axis thereof, an annular sealing element in said recess having sealing contact with the transverse surface of said stator and having in the sealing face thereof an annular groove in constant communication with the port in said transverse surface of said stator and with said recess, said rotor having a passage communicating with said recess on the outer side of said sealing element and adapted to be connected with a source of supply of fluid under pressure, the adjacent lateral surfaces of said recess and said sealing element having outwardly diverging portions, and sealing rings arranged to be pressed into sealing contact with the diverging surfaces on the respective sides of said sealing element by the pressure of the fluid in said recess.

15. In a rotary seal, a stator having at one end thereof a transverse surface provided with a plurality of ports spaced apart radially and circumferentially and a plurality of longitudinal passages communicating with the respective ports, a rotor having a surface substantially parallel with and adjacent to said surface of said stator and provided with a plurality of radially spaced annular recesses concentric with the axis of said rotor, and annular sealing elements in the respective recesses adapted to have sealing contact with said surface of said stator and having therein annular grooves concentric with the axis of said rotor and communicating with the respective ports, and also having passages connecting said grooves with the respective recesses, means in said recesses to prevent the passage of fluid between said sealing elements and the walls of said recesses, said stationary member having means whereby said recesses may be separately connected with a source of fluid under pressure.

16. In a rotary seal, a stator having at one end thereof a head of enlarged diameter provided with a transverse surface having a plurality of ports spaced apart radially and circumferentially, said stator also having a plurality of longitudinal passages and lateral passages in said head connecting said longitudinal passages with the respective ports; a rotor supported about said head and having a part substantially parallel with and adjacent to the transverse surface of said head, said part of said rotor having a plurality of radially spaced annular recesses concentric with the axis of said rotor, annular sealing elements supported in the respective recesses in sealing contact with said transverse surface of the head of said stator, each sealing element having an annular groove communicating with one of said ports and a passage connecting said groove with said recess, means for connecting said recesses with a source of fluid under pressure, and means for preventing the passage of fluid between the walls of said recesses and said sealing element.

17. In a rotary seal, a stator having at one end thereof a head of enlarged diameter provided with a transverse surface having a plurality of ports spaced apart radially and circumferentially, said stator also having a plurality of longitudinal passages and lateral passages in said head connecting said longitudinal passages with the respective ports; a rotor supported about said head and having a part substantially parallel with and adjacent to the transverse surface of said head, said part of said rotor having a plurality of radially spaced annular recesses concentric with the axis of said rotor, annular sealing elements supported in the respective recesses in sealing contact with said transverse surface of the head of said stator, each sealing element having an annular groove communicating with one of said ports and a passage connecting said groove with said recess, means for connecting said recesses with a source of fluid under pressure, and a pair of sealing rings arranged in each recess to be pressed against the lateral surfaces of the sealing element therein and the adjacent walls of said recess by the pressure of said fluid.

18. A rotary seal comprising a rotatable housing having an end wall and a circumferential wall, a stationary member extending into said housing and having at its inner end a transverse surface opposed to the end wall of said housing and provided with a plurality of ports spaced apart radially and circumferentially and also having a plurality of longitudinal passages connected with the respective ports, said end wall of said housing having a plurality of recesses extending about the axis of said housing and facing said transverse surface of said stationary member, annular sealing elements supported in the respective recesses in contact with said transverse surface of said stationary member, each sealing element having an annular groove concentric with said axis and in constant communication with one of said ports and with the recess in which said sealing element is supported, said housing having means for connecting each recess with a source of fluid supply, and a bearing interposed between said rotatable member and the circumferential wall of said housing.

19. A rotary seal comprising a circular housing having upper and lower walls spaced apart and rigidly connected one with the other, said lower wall having an axial opening, a member having a head arranged between said walls of said housing adjacent said upper wall, said member also having a small diameter portion extending through said opening in said lower wall, a bearing interposed between said small diameter portion and said lower wall to rotatably connect said housing with said member, said member having a plurality of ports in that surface of said head that is adjacent said upper wall of said housing and longitudinal passages connected with the respective ports, said end wall having a plurality of recesses extending about the axis of said housing and facing said head, sealing elements supported in the respective recesses in contact with said head, each sealing element having an annular groove concentric with the axis of said housing and in constant communication with one of said ports and with the recess in which the said sealing element is supported, said housing having means for connecting each recess with a source of fluid supply.

20. In a rotary seal, a stationary member and a rotatable member, said stationary member having a surface transverse to the axis of the rotatable member and also having a passage extending through said transverse surface at a point spaced from said axis, said rotatable member having a part opposed to said transverse surface and provided with a recess extending about and spaced from the axis thereof, an annular sealing element supported in said recess for movement in the direction of its axis into sealing engagement with said transverse surface of said stationary member, said sealing element having between the lateral edges of that surface thereof which is adjacent said stationary member an annular groove concentric with the axis of said rotatable member and communicating with the passage in said stationary member and with said recess, means for preventing the passage of fluid between said sealing element and the side walls of said recess, said rotatable member having means whereby said recess may be connected with a source of fluid supply, said sealing element having an opening therein, and a stud carried by said stationary member and extending into said opening to cause said sealing element to rotate with said rotatable member while permitting it to move in the direction of its axis.

21. In a rotary seal, a rotatable member, a stationary member connected with said rotatable member, having a sealing surface adjacent said rotatable member and having a plurality of passages extending through said sealing surface, said stationary member having a plurality of annular recesses arranged about the axis of said rotatable member and facing the sealing surface of said stationary member, said rotatable member also having means for connecting said recesses with a source of fluid supply, and an annular sealing element supported in each of said recesses in contact with said sealing surface and having an annular channel in constant communication with said recess and with one of said passages in said stationary member, said rotatable member having formed therein a lubricant receptacle and openings extending between adjacent recesses to conduct fluid from said receptacle to said sealing surface.

22. A rotary seal comprising two members one of which is rotatable with relation to the other, one of said members having a sealing surface adjacent the other member and having a passage extending through said sealing surface at a point spaced from the axis of said rotatable member, an annular sealing element connected with one of said members, engaging said sealing surface and having an annular channel in constant communication with said passage, and means for connecting said channel with a source of fluid supply and for subjecting said sealing element to pressure to maintain the same in firm contact with said sealing surface.

23. A rotary seal comprising two members having opposed surfaces, one of said members being rotatable with relation to the other member, one of said members having an annular recess arranged about the axis of the rotatable member and also having means for connecting said recess with a source of fluid supply, an annular sealing element supported in said recess with one surface thereof in sealing contact with the surface of the other member, one of said surfaces having therein an annular groove, said other member having a passage in constant communication with said groove, and means for connecting said groove with said recess and said source of fluid supply.

EDWIN G. HALBY.
ROBERT J. BUSHONG.